United States Patent

[11] 3,543,983

[72] Inventors Ralph H. Dale
Littleton;
Roy D. Youngblood, Englewood, Colorado
[21] Appl. No. 753,622
[22] Filed Aug. 19, 1968
[45] Patented Dec. 1, 1970
[73] Assignee Honeywell Inc.
Minneapolis, Minnesota
a corporation of Delaware

[54] CONTINUOUS LOOP TRANSPORT
8 Claims, 5 Drawing Figs.

[52] U.S. Cl. .......... 226/118, 226/195, 226/196
[51] Int. Cl. .......... B65h 17/42
[50] Field of Search .......... 226/118, 195, 196, 95, 97, 181; 242/182; 179/100.2Z

[56] References Cited

UNITED STATES PATENTS

| | | | |
|---|---|---|---|
| 2,348,355 | 5/1944 | Miller | 226/118X |
| 3,048,315 | 8/1962 | Pankratz | 226/118 |
| 3,161,337 | 12/1964 | Schulz | 226/118 |
| 3,231,668 | 1/1966 | Nishiwaki | 226/195X |
| 3,265,817 | 8/1966 | Gilman | 226/118X |
| 3,356,275 | 12/1967 | Wright | 226/195 |

*Primary Examiner*—Richard A. Schacher
*Attorney*—Arthur H. Swanson and Lockwood D. Burton

ABSTRACT: A continuous loop transport is shown for moving magnetic tape across magnetic record/reproduce heads at a high rate of speed. The continuous loop of magnetic tape is drawn into a bin by a pair of grooved driving drums. A pair of pickoff guides having fingers engage the grooves within the drums for removing the tape therefrom. The guides pass the tape through a tape guide path toward the upper portion of one side of the bin. The larger driving drum is arranged with its periphery substantially within the bin for urging the tape entering the bin toward the bin exit on the opposite side thereof. As the tape exits the bin, it passes over a vacuum guide for initially tensioning the tape prior to passing over the magnetic record/reproduce heads and reentering the bin. Further tension control is provided for by a pair of vacuum bins located on each side of the record/reproduce heads.

INVENTORS.
RALPH H. DALE
ROY D. YOUNGBLOOD
BY [signature]
ATTORNEY.

INVENTORS.
RALPH H. DALE
ROY D. YOUNGBLOOD
BY M. Nicholas Carpenter
ATTORNEY.

CONTINUOUS LOOP TRANSPORT

The present invention relates to a continuous loop transport and more particularly to a continuous loop transport capable of moving a thin flexible web member, such as magnetic tape, at a high rate of speed across an electromagnetic transducer, such as magnetic record/reproduce heads, and into a storage bin.

The utilization of a continuous loop transport for continuously moving an endless loop of magnetic tape across magnetic record/reproduce heads is well known in the art. These devices are useful for many purposes, such as analyzing information previously recorded upon the magnetic tape by continuously reproducing this information at different speeds. Continuous loop transports have also been utilized for recording information relating to a future event which will happen at an unknown time. In this application, the continuous loop records the data and continuously erases previously recorded data until the event occurs. After the event, the recording is terminated before the magnetic tape is erased by another pass over the magnetic record/reproduce heads. The information recorded on the magnetic tape thus includes information leading up to and immediately following the event.

There are three basic types of continuous loop transports known in the art. These include a transport utilizing a plurality of roller guides which guide a magnetic tape loop of a generally fixed length through a fixed loop path. The second form includes a toroidally shaped coil wherein the tape is removed from the inner surface of the coil, passed over a magnetic head and coiled upon the outer surface thereof. This coil arrangement is known in the art as a "Cousino loop". The third type of continuous loop transport utilizes a tape storage bin from which the tape is drawn, passed over the magnetic heads, and then returned to the bin. One advantage of this arrangement over the others is that the length of tape within the bin may vary from a substantially short loop to a loop whose maximum length is governed by the physical arrangement of the bin.

Continuous loop transports of the bin type have been known in the prior art for some time. These bins are generally limited in their capabilities to moving magnetic tape at lower speeds. That is, the prior art bins are not capable of introducing the tape into the bin at a high rate of speed. Once the tape is introduced into the bin it normally folds into smaller loops. At high speeds the loop formation is uncertain and the loops concentrate in certain areas of the bin, thus limiting the speed at which the tape may be removed therefrom. In the design of continuous loop transports of the bin type, it is necessary to provide for tensioning within the tape as it exits the bin. Most prior art devices provide tensioning arrangements which have a tendency to oscillate as the tape exits the bin at a high rate of speed. These arrangements also create oscillation within the tape which is detrimental to high speed recording or reproducing.

Accordingly, it is an object of the present invention to provide a continuous loop transport which is capable of moving a thin flexible web member at a high rate of speed.

Another object of the present invention is to provide a continuous loop transport of the bin type which is capable of moving magnetic tape at a high rate of speed across magnetic heads associated therewith while providing a unique means for controlling the tension across the magnetic heads and within the continuous loop.

Still another object of the invention presented herein is to provide a continuous loop transport of the bin type with a tape feed mechanism which is capable of achieving improved packing and loading of the bin for better utilizing the bin by storing a longer length of tape within the fixed bin size.

A further object of the present invention is to provide a guiding arrangement for a continuous loop transport which prevents the tape from wrapping around the driving drums as the tape is introduced into the storage bin at a relatively high rate of speed.

Still a further object of the present invention is to provide a continuous loop transport which is capable of moving magnetic tape across magnetic transducing heads at various speeds wherein the loop transport arrangement is insensitive to speed changes.

In accomplishing these objects there has been provided a tape storage bin having driving means for drawing a magnetic tape from the bin, across transducing heads and introducing the magnetic tape back into the bin. Guide means are provided for removing the magnetic tape from the driving means and urging the tape into the bin in the form of continuous tape folds. The driving means cooperate with the bin means for urging the folds formed within the tape toward tension means located at the exit of the bin. Further tension means control the tension within the loop as it crosses the transducing heads.

Other objects and many of the attendant advantages of the present invention will become readily apparent to those skilled in the art as a better understanding thereof is obtained by reference to the following detailed description when considered in connection with the accompanying drawings, wherein.

Figure 1:
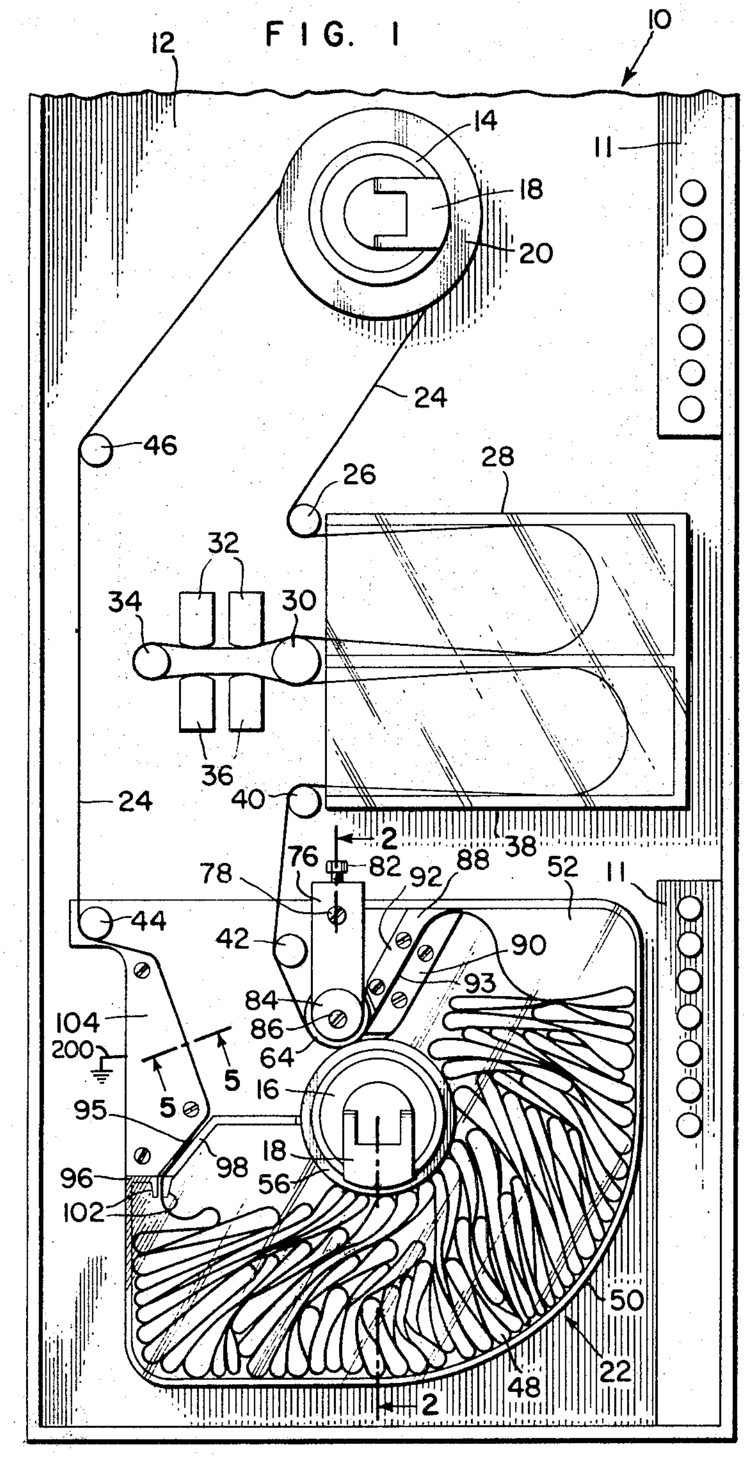
FIG. 1 is a front elevational view showing a tape transport embodying the present invention.

Referring now to the drawings and particularly to FIG. 1, a tape transport is shown generally at 10 having a control panel 11 and a mounting plate 12 to which supply and takeup reel mounting hubs, 14 and 16 respectively, are attached. The supply and takeup reel mounting hubs attach to the shaft of a supply and takeup motor, not shown, and are arranged for mounting a reel of magnetic tape when the tape transport 10 is utilized as a reel mounting machine. During this time the reel mounting hubs clamp a reel by the clamping action of the cam lock member 18 as described in U.S. Pat. application Ser. No. 626,820, filed Mar. 29, 1967 by Sanford et al. and assigned to the assignee of the present invention. In the embodiment of the present invention, the supply reel mounting hub 14 mounts an idler drum 20 while the takeup reel mounting hub 16 mounts a tape storage bin shown generally at 22. The idler drum 20 and the tape storage bin 22 are clamped to the supply and takeup reel mounting hubs 14 and 16 by the expansion of the hubs when the cam lock member 18 is placed in its locked position, as described in the Sanford et al. patent referred to herein.

A continuous loop of magnetic tape 24 passes over the idler drum 20, around a guide roller 26 and enters a tension controlling vacuum bin 28. As the tape exits the vacuum bin, it passes over a damping roller 30, across a pair of electromagnetic transducers in the form of magnetic record/reproduce heads 32 and wraps 180° about a capstan 34. The magnetic tape 24 then crosses over a second pair of magnetic record/reproduce heads 36, over the damping roller 30 and enters a second tension controlling vacuum bin 38. As the magnetic tape 24 exits the vacuum bin 38, it passes over a guide roller 40 and enters the tape storage bin 22 after passing over a first storage bin guide 42. The tape 24 exits the storage bin 22 over a second storage bin guide 44 before passing around an auxiliary guide 46 and wrapping about the idler drum 20 to complete the path of the endless tape loop.

The idler drum, shown generally at 20, is constructed in the form of a large guide roller. The outer periphery of the drum is coated with an elastomeric material while the ends thereof are provided with extended portions which form flanges for guiding the endless tape loop. The idler drum 20, is provided with an aperture extending along the longitudinal axis thereof through which the supply reel mounting hub 14 passes for clamping the drum in its operating position.

The tape storage bin, shown generally at 22, includes a mounting plate 48 which forms the lower surface of the tape storage bin and acts to guide the backmost edge of the endless tape loop 24. The mounting plate is equipped with sidewalls 50 which space a transparent cover plate 52 in a plane parallel to the mounting plate 48 and at a distance slightly greater than the width of the endless tape loop 24. The cover plate 52 thus forms the guiding means for the frontmost edge of the tape 24. The center portion of the mounting plate 48 is relieved for mounting a bearing 54 which, in turn, rotatably mounts a first driving drum 56. The drum 56 is formed from a cylindrical member whose outer periphery is provided with an inwardly relieved portion 58 for mounting within the inner race of the bearing 54. A mounting ring 60 attaches to the inwardly relieved portion 58 for clamping the cylindrical member to the bearing 54, as by threads. The outer periphery of the cylindrical driving drum 56 is provided with a pair of grooves 62, while the inside diameter thereof fits over the outer diameter of the takeup reel mounting hub 16 when the cam lock member 18 is in the open position. As the cam lock member closes, the outside diameter of the takeup reel mounting hub 16 expands for locking the tape storage bin 22 into place. It should be noted that this is the only step necessary for mounting the tape storage bin 22 and that no external mounting hardware is required.

The mounting plate 48 and cover plate 52 combine with the side walls 50 for forming a generally J-shaped tape storage bin 22. That is, the outer periphery of the first driving drum 56 is relatively large for allowing the inner diameter thereof to fit over the outside diameter of the takeup reel mounting hub 16. This outer periphery is arranged with more than 270° thereof disposed within the tape storage bin 22. When viewing the bin from the front, as in FIG. 1, the side wall 50 curves about the central axis formed by the first driving drum 56 for forming an outer bin edge surface which is concentric with the drum 56. The endless tape loop 24 is introduced into the J-shaped tape storage bin thus formed at the top of the longer leg of the J, while the tape is removed from the top of the shorter leg of the J.

Figure 2:
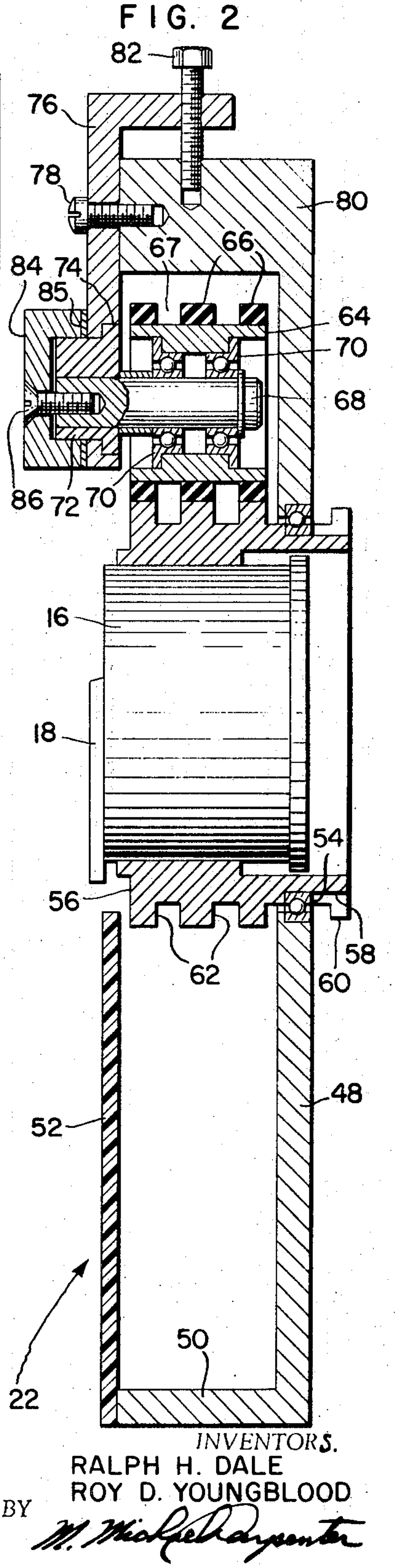
FIG. 2 is a cross-sectional view taken along lines 2–2 of FIG. 1.

The first driving drum 56 tangentially contacts a second driven drum 64 for urging the magnetic tape 24 passing therebetween into the tape storage bin 22. The first driving drum 56 and the second driven drum 64 combine to form the driving mechanism for the tape storage bin 22. As best seen in FIG. 2, the second driven drum 64 is provided with a plurality of outwardly extending rings 66 which tangentially contact the driving drum 56. Thus, the space between the rings 66 forms grooves 67 which coincide with the grooves 62 formed in the first driving drum 56. In the present embodiment, the extending rings 66 are constructed from an elastomeric material. The second driven drum 64 is rotatably mounted upon a shaft 68 by a pair of flanged ball bearings 70. The shaft 68 mounts within a flanged collar 72 whose flange slidably fits within a counterbored aperture 74 formed in an L-shaped mounting arm 76. The L-shaped mounting arm 76 is attached by locking screws 78 to a mounting portion 80 of the side wall 50. An adjustable screw 82 is provided for moving the L-shaped mounting arm 76 toward the periphery of the first driving drum 56. The shaft 68 is eccentrically offset within the flanged collar 72. A clamping cap 84 attaches to the upper end of the shaft 68, as by a felt washer 85 and a screw 86. The clamping cap 84 is internally threaded to engage a thread on the surface of the flanged collar 72 which extends through the aperture 74. Thus, rotation of the clamping cap 84 loosens the collar 72 for adjusting the driven drum 64 against the driving drum 56. This adjustment facilitates loading of the endless tape loop 24 within the tape storage bin 22. The final adjustment of the driven drum in its operating position is achieved by the use of the adjustable screw 82.

Figures 3, 4:
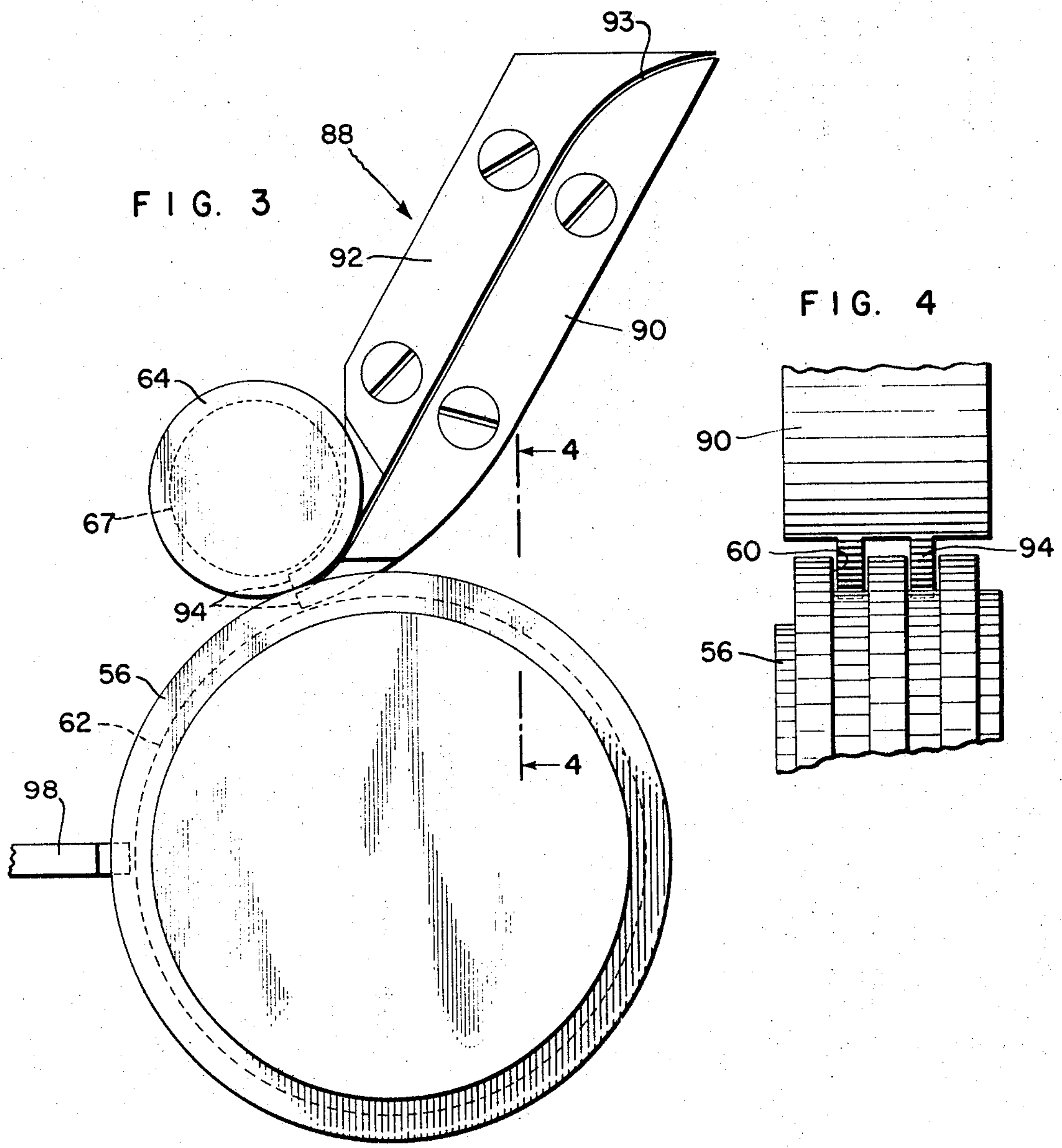
FIG. 3 is an enlarged elevational view showing the driving mechanism in more detail.
FIG. 4 is a cross-sectional view taken along line 4–4 of FIG. 3.
Figure 5:
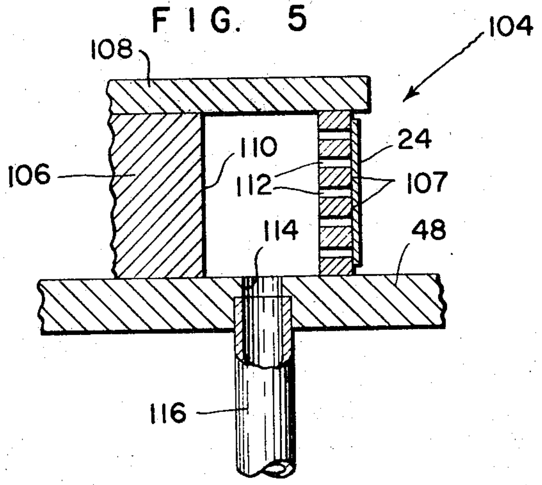
FIG. 5 is a cross-sectional view taken along line 5–5 of FIG. 1.

The endless tape loop 24 is threaded between the first driving drum 56 and the second driven drum 64 where it is picked therefrom and passed through a guiding chute 88, as seen in detail in FIG. 3. The guide chute 88 consists of a pair of tape pickoff guides 90 and 92 which are spaced apart from each other no more than three thicknesses of magnetic tape for forming an S-shaped tape guide path channel 93. Thus, the magnetic tape and splice are pushed through the channel 93, formed between the tape pickoff guides 90 and 92, by the rotational action of the first driving drum 56 and the pressure contact of the second driven drum 64. The S-shaped channel 93 opens into the J-shaped tape storage bin 22 along the upper surface of the longest leg of the J. The mounting plate 48 and cover plate 52 form guiding edges for restraining the lateral motion of the endless tape loop 24. Each tape pickoff guide, 90 and 92, is provided with a pair of fingers 94 which engage the grooves within the driving and driven drums. That is, the fingers 94, extending from the tape pickoff guide 90, extend into grooves 62 within the periphery of the first driving drum 56. The fingers 94, extending from the tape pickoff guide 92, extend into the grooves 67 within the second driven drum 64. It will be noted that the fingers 94 on the tape pickoff guide 90 pick the tape 24 from the surface of the first driving drum 56 and prevent the tape from being accidentally folded between the guide and drum. In a similar manner, the fingers extending from the tape pickoff guide 92 prevent the tape from folding between that guide and the second driven drum 64.

As the tape exits from the channel 93 formed between the pickoff guides 90 and 92, it enters the tape storage bin 22 along the upper surface of the longer leg of the J-shaped bin. At a high speed, the tape passes along this surface and contacts the curved corner of the bin where it begins to fold into the bin. A second fold will thereafter begin to form along the top surface of the bin. These folds are then urged around the bin 22 toward the exit located in the opposite leg thereof. The rotational motion of the driving drum 56 is a substantial aid in urging these folds toward the exit and preventing them from bunching up, thus slowing the maximum speed of the continuous loop transport.

The endless tape loop 24 exits the tape storage bin 22 through an exit channel 95 formed between an extended portion 96 of the wall 50 and a closure wall 98. The closure wall is attached to the mounting plate 48, as by screws, and provided with fingers, FIG. 3, which extend into the grooves 62 within the driving drum 56. The extended portion 96 of wall 50 and the closure wall 98 are provided with downwardly extending fingers 102 which act to peel the folds of magnetic tape from that portion of the tape which is passing through the exit channel 95. The width of channel 95 is again arranged to be no greater than three thicknesses of magnetic tape. It should be noted that the magnetic tape is normally spliced by a splice whose thickness is substantially equal to the thickness of the tape. Thus, for a magnetic tape of 1 mil thickness and a splice 1 mil thick, the channel opening should be approximately 2.5 to 3 mils wide.

As the tape 24 exits the channel 95, it passes over a vacuum tape tensioning device 104. The vacuum tape tensioning device includes a block 106 having a tape contacting and guiding surface 107 attached by screws, not shown, to the mounting plate 48. A top guide plate 108 extends beyond the tape contacting surface 107 of the block 106 to form a flange that acts in conjunction with the mounting plate 48 for restraining the lateral motion of the magnetic tape 24. The block 106 is provided with a vacuum chamber 110 which parallels the tape contacting surface 107 thereof. A plurality of apertures 112 pass from the vacuum chamber 110 to the tape contacting surface 107. An aperture 114 within the mounting plate 48 is provided for connecting a vacuum source, not shown, to the vacuum chamber 110 by a suitable vacuum line 116. As the magnetic tape 24 passes over the tape contacting surface 107, the vacuum within the apertures 112 creates a differential pressure across the tape for urging it against the tape contacting surface. The differential pressure thus establishes a means for initially tensioning the endless tape loop 24 as it exits the tape storage bin 22. This arrangement eliminates the spring loaded mechanical arrangements which are found in many prior art devices.

In the preferred embodiment of the present invention, the mounting plate 48, sidewall 50, driving drum 56, tape pickoff guides 90 and 92, closure wall 98, and tape contacting surface 107 of block 106 are all constructed from a conductive metal, such as aluminum. The tape contacting surfaces of these structures are then coated with a protective finish which will not effect the conductivity of these components, such as clear iridite. Care is then taken to insure that all components are conductively connected to each other and that the components are connected to a source of reference potential, such as ground 200. In this manner, static charges generated by the magnetic tape moving at a high rate of speed are prevented. This is a necessary step in achieving the high speed continuous loop transport of the present invention.

In operation, the appropriate speed is selected on the control panel 11 and the tape transport 10 is placed in the desired record or reproduce mode. The capstan 34 begins to rotate at the selected speed thus drawing tape from the vacuum bin 28 and driving it into the vacuum bin 38. The reel motors which drive the supply reel mounting hub 14 and the takeup reel mounting hub 16 are servo controlled from the vacuum bins 28 and 38, respectively. As tape is removed from the vacuum bin 28, the servocontrol causes the motor attached to the supply reel mounting hub, not shown, to rotate in a clockwise direction. In a similar manner, the servocontrol associated with the vacuum bin 38 causes the motor which drives the takeup reel mounting hub, not shown, to rotate for driving the hub and first driving drum 56 in a clockwise direction. Under the urging of the driving drum 56, the tape enters the bin 22 and travels along the upper surface of the longer leg thereof at a substantially high rate of speed. When the tape contacts the curved portion of the side wall, it is driven in a downward direction and folded by the bin configuration. A second fold then begins to form as the tape is driven from the guide chute 88. At a lower speed, the tape falls under the influence of its own weight before contacting the sidewall of the tape bin. In either case, the folds which are formed are urged from the longer leg of the J-shaped tape storage bin 22 toward the exit in the shorter leg thereof. The guide chute 88 removes the tape from the driving drums and feeds the tape into the storage bin 22 for allowing improved packing and loading thereof. This results in a tape storage bin which is more efficiently packed for storing a longer length of endless tape loop for a given bin size.

As the tape is withdrawn from the bin, the fingers 102, associated with the extended portion 96 of the wall 50 and the closure wall 98, prevent a plurality of folds from being drawn through the channel 95. The tape is withdrawn across the vacuum tape tensioning device 104 by the rotational motion of the supply reel mounting hub 14 and the idler drum 20 mounted thereon. The vacuum tape tensioning device 104 holds the tape sufficiently against the tape contact surface 107 to place an initial tension thereon. Thus, it will be seen, that the magnetic tape within the tape storage bin 22 is stored without tension, while that portion of the loop between the vacuum tape tensioning device 104 and the driving and driven drums, 56 and 64, is initially tensioned by the vacuum control provided at the vacuum tape tensioning device 104. The vacuum bins 28 and 38 provide further tension control within this portion of the endless tape loop 24. This arrangement allows the tape to be moved across the magnetic record/reproduce heads 32 and 36 at a substantially high rate of speed, free of oscillatory disturbances often associated with high speed magnetic tape.

The driving arrangement formed by the grooved driving drum 56 and the grooved driven drum 64 in combination with the unique guide chute 88 and the fingers associated therewith allows the endless tape loop 24 to be introduced into the tape storage bin 22 at a substantially high rate of speed. At the same time, the chute 88 combines with the configuration of the tape storage bin 22 for forming the endless tape loop into folds as it enters the bin. The unique arrangement of the first driving drum 56 with its periphery substantially within the tape storage bin 22 provides a means for urging the folds formed within the endless tape loop continuously from the entrance of the storage bin toward the exit thereof. As indicated herein above, this unique arrangement prevents the fold from becoming tightly packed as the tape is passed through the tape storage bin at a high rate of speed. As the endless tape loop 24 exits the tape storage bin 22, it is first tensioned by the tape tensioning device 104. This tension is further controlled by the vacuum bins 28 and 38. These three vacuum tensioning devices combine to uniquely control the tape tension across the magnetic record/reproduce heads and to eliminate high speed tape disturbances.

It should be noted that the prior art tape bins operate at maximum linear tape speeds of 60 and 120 inches per second (i.p.s.). The present invention has been designed to operate at higher speeds. For example, a model of the present invention has been constructed and operated at twice and four times the maximum prior art speeds; that is, 240 i.p.s. and 480 i.p.s. It is believed that even higher speeds may eventually be obtained through the utilization of the present invention.

Thus, there has been provided a continuous loop tape transport which is capable of moving magnetic tape therethrough at a high rate of speed. Obviously, many modifications and variations of the present invention will become apparent to those skilled in the art; and, therefore, the present invention should be limited only by the appended claims.

We claim:

1. A continuous loop transport attachment for a conventional tape recorder apparatus having a takeup reel spindle hub capable of moving tape at a high rate of speed, said attachment comprising:
bin means for receiving said tape;
driving means arranged for driving said tape into said bin means at said high rate of speed, said driving means including at least one driving drum means arranged with the periphery thereof substantially within said bin means and positioned to fit over and be driven by said takeup reel spindle hub;
guide means forming a tape guide path, said guide means engaging said driving means for preventing said tape from passing out of said tape guide path established thereby, and said guide means cooperating with said bin means for forming said tape into folds as said tape enters said bin means from said tape guide path;
tensioning means arranged to place said tape under tension as said tape exits said bin means; and
said bin means and said drum means arranged for urging said tape folds from said guide means toward said tensioning means where said tape exits said bin means; whereby said tape is moved through said bin means at said high rate of speed.

2. The combination as claimed in claim 1, wherein:
said drive means includes a pair of drum means having grooved peripheries tangentially contacting each other for driving said tape therebetween; and
said guide means includes finger means engaging said drum grooves; whereby said tape is prevented from passing out of said tape guide path established thereby.

3. The combination as claimed in claim 2, wherein:
said guide means includes first and second pickoff means forming a chute therebetween for establishing said tape guide path; and
said finger means extend from said first and second pickoff means and engage said grooves within each of said pair of drum means.

4. The combination as claimed in claim 1, wherein:
said drum means included in said drive means includes a large diameter drum rotationally mounted within said bin means; and
said bin means is formed with a smooth internal periphery concentrically arranged with said drum means.

5. The combination as claimed in claim 4, wherein said bin means includes metallic surfaces conductively connected to a point of reference potential for preventing the accumulation of static charges on said tape as said tape is moved through said bin means at said high rate of speed.

6. The combination as claimed in claim 1, wherein:
said tensioning means includes a surface over which said tape is contiguously drawn; and
means for applying a pressure differential across said tape and said surface; whereby said tape is placed under tension as it exits said bin means and isolated from oscillatory motions normally created at said high rate of speed.

7. The combination as claimed in claim 1, wherein:
said drive means includes first and second grooved drum means, said first drum means having a large periphery rotationally mounted within the center of said bin means;
said bin means is formed with a smooth internal periphery concentrically arranged with said first drum means;
said guide means includes fingered first and second pickoff means arranged with said fingers engaging said drum grooves for guiding said tape toward one side of said bin within said tape guide path established therebetween;
said tensioning means arranged on the side of said bin means opposite said guiding means; and
said first drum means of said driving means thereby urging said folds formed in said tape by said guide means and said bin means toward said tension means where said tape exits said bin means.

8. The combination as claimed in claim 7, wherein said high rate of speed is at least 240 i.p.s.